United States Patent [19]

Snowball

[11] Patent Number: 4,762,613
[45] Date of Patent: Aug. 9, 1988

[54] WATER PURIFIERS

[75] Inventor: Malcolm R. Snowball, St. Leonards-on-Sea, Great Britain

[73] Assignee: William Still & Sons Limited, East Sussex, Great Britain

[21] Appl. No.: 104,515

[22] Filed: Oct. 1, 1987

Related U.S. Application Data

[63] Continuation of Ser. No. 857,646, Apr. 29, 1986, abandoned.

[30] Foreign Application Priority Data

May 24, 1985 [GB] United Kingdom ............... 8513173

[51] Int. Cl.⁴ .............................................. C02F 1/32
[52] U.S. Cl. .............................. 210/192; 210/198.1; 210/243; 210/244; 210/748; 210/764; 250/436; 250/438; 250/455.1; 422/24
[58] Field of Search ............... 210/192, 198.1, 243, 210/244, 245, 246; 422/24; 250/436, 437, 438, 455.1

[56] References Cited

U.S. PATENT DOCUMENTS

| | | | |
|---|---|---|---|
| 1,051,350 | 1/1913 | Nogier | 422/24 |
| 1,190,609 | 7/1916 | Recklinghausen | 250/438 |
| 1,191,304 | 7/1916 | Helbronner | 250/438 |
| 1,200,940 | 10/1916 | Helbronner | 250/437 |
| 1,218,147 | 3/1917 | Wilson | 210/244 |
| 1,278,278 | 9/1918 | Wood | 422/24 |
| 1,473,095 | 11/1923 | Henri | 250/437 |
| 1,842,313 | 1/1932 | Chaney | 422/24 |
| 1,898,365 | 2/1933 | Harding | 422/24 |
| 1,969,655 | 8/1934 | Mailey | 422/24 |
| 2,470,806 | 5/1949 | Del Cueto | 250/436 |
| 2,669,661 | 2/1954 | Riddiford | 250/438 |
| 3,079,498 | 2/1963 | Ruffin | 250/437 |
| 3,309,159 | 3/1967 | Sueur | 422/24 |
| 3,843,521 | 10/1974 | Zeff | 422/24 |
| 3,906,236 | 9/1975 | Callahan | 250/455.1 |
| 3,923,663 | 12/1975 | Reid | 422/24 |
| 3,971,947 | 7/1976 | Lambert | 250/437 |
| 4,101,777 | 7/1978 | Reid | 422/436 |
| 4,276,256 | 6/1981 | Karamian | 422/24 |
| 4,296,328 | 10/1981 | Regan | 250/436 |
| 4,322,291 | 3/1982 | Ho | 422/24 |

FOREIGN PATENT DOCUMENTS

WO84/03880 10/1984 PCT Int'l Appl. ............... 210/748

*Primary Examiner*—Ernest G. Therkorn
*Attorney, Agent, or Firm*—Wood, Herron & Evans

[57] ABSTRACT

An ultra-violet ray water sterilizer comprising a container having two chambers connected together only adjacent the bottom internal surfaces of the chambers, one chamber containing a germicidal ultra-violet ray lamp extending up the chamber from the bottom surface thereof, the said one chamber having an outlet adjacent the top of the ultra-violet lamp, the second chamber having a water inlet. Thus, the water may be poured into the said second chamber and when this is to be dispensed upon tilting the units so that water emerges from the outlet at the top of the first chamber, all the water passes the ultra-violet ray lamp and becomes sterilized.

4 Claims, 1 Drawing Sheet

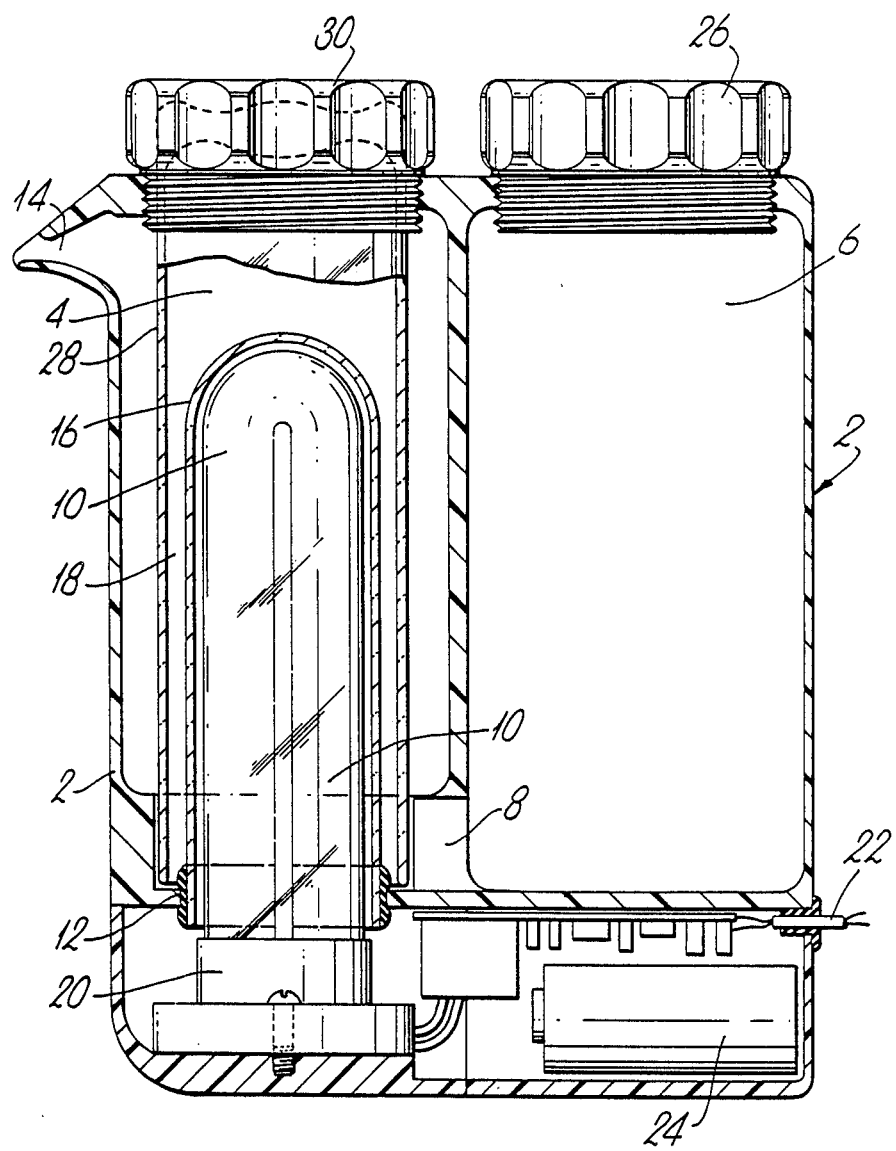

WATER PURIFIERS

This application is a continuation of application Ser. No. 857,646, filed Apr. 29, 1986, now abandoned.

This invention relates to water sterilisers and in particular to water sterilisers comprising a germicidal ultra-violet lamp.

It is known that if water flows past a germicidal ultra-violet lamp in close proximity thereto harmful bacteria in the water are killed by the ultra-violet rays in the so called germicidal wavelengths (180 nM–280 nM) with the result that the water is sterilised.

A problem which is encountered by travellers in countries where the mains water supply has not been sterilised is that it is difficult for them to obtain pure drinking water. Sterilising tablets are known but these often impart an unpleasant taste to the water.

An ultra-violet ray water steriliser in accordance with this invention comprises a portable container having two chambers connected together only adjacent the bottom surface of the chambers, one chamber containing a germicidal ultra-violet lamp extending up the chamber from the bottom thereof, this chamber having adjacent the top of the ultra-violet lamp, an outlet (preferably a spout) and the second chamber having a water inlet.

In use water to be sterilised is introduced into the top of the second chamber and then flows through the bottom opening to the first chamber containing the u.v. lamp. Only a relatively small gap is left between the lamp and the inner wall of the container so that water being poured out from the first chamber has to pass up along the length of the u.v. lamp closely adjacent thereto to ensure that during this passage the water is sterilised.

The u.v. lamp may be surrounded by a quartz thimble and be actuated either by a battery and/or mains electricity supply, and so designed as to emit rays of the correct wavelength (known as the germicidal wavelengths) to kill bacteria in the water.

In order to ensure that a drinking glass is also sterilised, the glass may be incorporated in the sterilising unit extending down from the top of the first chamber with its open end extending over the u.v. tube.

It will be appreciated that a sterilising device in accordance with the invention may be comparatively lightweight and may be of comparatively small dimensions to make it easily portable and in use all that needs to be done is for unpurified water to be poured in the top of one chamber and sterilised water can then be poured out immediately from the unit.

For water that is turbid, or has a high particulate content, a pre-filter attachment may be used to clear the water as it enters the water inlet chamber.

The invention will now be further described by way of example with reference to the accompanying drawing which is a section through one embodiment of a purifier in accordance with the invention.

BRIEF DESCRIPTION OF THE DRAWING

Referring to the drawing the purifier comprises an outer casing 2 formed with two internal chambers 4, 6. The two chambers are connected adjacent the bottom surface by a passage 8.

DESCRIPTION OF THE PREFERRED EMBODIMENT

A u.v. germicidal lamp 10 extends up through the base 12 of the first chamber 4 to a position adjacent the top of that chamber and adjacent an outlet in the form of a pouring spout 14. The u.v. lamp is surrounded by a quartz thimble 16 and the annular passage 18 between the thimble 16 and the inner surface of the casing 2 is dimensioned such that water entering the chamber 4 through the passage 8 and flowing up to the outlet 14 is caused to pass sufficiently close to the u.v. lamp 10 for it fully to be sterilised by the u.v. rays being emitted from the lamp.

The germicidal ultra violet lamp 10 is connected by a receptacle or socket 20 in the base of the unit below the chamber 4 to a power supply either in the form of a mains connection 22 or by a battery 24. The power supply is arranged to either power the lamp directly through an electronic circuit or charge batteries when the device is not in use but plugged in.

In use, water is poured into the second chamber 6 through the open top thereof after removal of a screw on cap 26, and this water before being poured from the spout 14 of the first chamber passes through a connecting passage 8 and up the first chamber 4 around the u.v. tube.

If desired the casing 2 or an inner sleeve between the casing 2 and the quartz thimble 16 (not shown) can be provided with a turbulator for example by being formed with a groove or grooves as described in our co-pending British application to ensure that water passing up from the inlet passage 8 to the outlet passage 14 of the chamber 4 passes repeatedly into close proximity to the quartz sleeve 16.

If desired a drinking glass made of quartz glass 28 may be inserted into the chamber 4 through the top thereof with its open end extending over the quartz thimble 16. The glass is held in place by a screw on cap 30. The effect of this is that the internal and external surfaces of the glass are substantially sterilized by the rays being emitted by the u.v. tube 10 when this is energised.

The same sterilization effect can be achieved with several variations on this theme.

(a) The quartz thimble can be replaced with a 'Teflon' tube or thimble.

(b) The u.v. germicidal lamp can be one with an integral second skin and vacuum space hence isolating the working lamp from the water and negating the need for a quartz thimble.

(c) A quartz or 'Teflon' tube can be wound in a Helix and placed around the u.v. germicidal lamp, one end of the tube being connected to orifice 8 and the other end to the pouring spout 14.

What I claim is:

1. A portable ultra-violet ray water sterilizer comprising a container having first and second chambers with a water passage therebetween only adjacent the bottom internal surfaces of said chambers, said container being sized so that it is manually portable, a water outlet adjacent the top of said first chamber, and a water inlet for said second chamber, wherein said water outlet is a pouring spout and a germicidal ultra-violet ray lamp fixed in said first chamber, said lamp extending up from the bottom internal surface of said first chamber, said first chamber and said lamp being sized to provide a relatively close fit therebetween so that all water is sterilized at it flows through said first chamber between said passage and whereby tipping said container causes substantially all of said water in said second chamber to flow through said first chamber between said lamp and the surface of said first chamber, sterilizing said water as it flows through said first chamber and out said container.

2. A portable sterilizer as claimed in claim 1, said sterilizer comprising
a quartz thimble positioned in said first chamber, said lamp being surrounded by said thimble.

3. A portable sterilizer as claimed in claim 1, said sterilizer comprising
a teflon tube positioned in said first chamber, said lamp being surrounded by said tube.

4. A portable sterilizer as claimed in claim 1, said sterilizer comprising
a drinking glass mounted to said container, said drinking glass being positioned within said first chamber with its open end extending over said lamp.

* * * * *